(12) United States Patent
Azai (10) Patent No.: US 7,210,149 B2
(45) Date of Patent: Apr. 24, 2007

(54) DISC INSERTION PREVENTIVE DEVICE

(75) Inventor: Kouji Azai, Fukui (JP)

(73) Assignee: Orion Electric Co., Ltd., Fukui (JP)

( * ) Notice: Subject to any disclaimer, the term of this patent is extended or adjusted under 35 U.S.C. 154(b) by 506 days.

(21) Appl. No.: 10/853,314

(22) Filed: May 26, 2004

(65) Prior Publication Data
US 2004/0221301 A1  Nov. 4, 2004

Related U.S. Application Data

(63) Continuation-in-part of application No. 10/693,994, filed on Oct. 28, 2003, now abandoned.

(30) Foreign Application Priority Data

Oct. 28, 2002 (JP) ............................. 2002-312478
May 26, 2003 (JP) ............................. 2003-147172

(51) Int. Cl.
G11B 17/04 (2006.01)
G11B 33/02 (2006.01)
(52) U.S. Cl. .................................... 720/619; 720/616
(58) Field of Classification Search ............... 720/616, 720/619, 631, 656
See application file for complete search history.

(56) References Cited

U.S. PATENT DOCUMENTS 5,610,892 A * 3/1997 Choi .......................... 720/631

6,839,898 B2 * 1/2005 Saji et al. .................... 720/619
2002/0159373 A1 * 10/2002 Saji et al. .................... 369/77.1

FOREIGN PATENT DOCUMENTS

| JP | 1-227258 | 9/1989 |
| JP | 11-149688 | 6/1999 |
| JP | 2001-331999 | 11/2001 |
| JP | 2002-150652 | 5/2002 |
| JP | 2002260316 A * | 9/2002 |
| JP | 2003168254 A * | 6/2003 |

* cited by examiner

*Primary Examiner*—William J Klimowicz
(74) *Attorney, Agent, or Firm*—Wenderoth, Lind & Ponack, L.L.P.

(57) ABSTRACT

Disclosed is a disc insertion preventive device comprising a housing having a disc slot made on its front side, a generally stopper and a swinging mechanism. The stopper comprises a flat plate and front and rear blocking pieces dependent from the opposite lateral edges of the flat plate. The stopper is pivotally fixed to the housing with the front blocking piece directed toward the disc slot of the housing. The swinging mechanism is responsive to absence of a disc in the housing for inclining the stopper with the rear blocking piece down and with the front blocking piece up, thus preventing advance of a disc beyond the descendent rear blocking piece, and is responsive to presence of a disc in the housing for inclining the stopper with the rear blocking piece up and with the front blocking piece down, thus preventing insertion of another disc from the disc slot.

5 Claims, 10 Drawing Sheets

DISC INSERTION PREVENTIVE DEVICE

This is a Continuation-In-Part Application of U.S. patent application Ser. No. 10/693,994, filed Oct. 28, 2003 now abandoned.

BACKGROUND OF THE INVENTION

1. Field of the Invention

The present invention relates to a disc insertion preventive device which assures that when a disc apparatus is already loaded with a disc, another disc is prevented from being inserted into the apparatus.

2. Related Art

The disc apparatus records or reproduces information such as sound and pictures that stored in a disc, which is put on its turning table. There are various loading methods. For one example use is made of a reciprocating tray which carries a disc from the disc slot to the turning table or vice versa. For another example use is made of a pull-in mechanism which is responsive to insertion of a disc from the disc slot for gripping and pulling the disc toward the turning table in the housing.

A disc insertion preventive device according to the present invention is appropriate for use in the latter loading type. The user often tries to push a disc into the disc apparatus without making sure that it is not loaded with a disc. Then, the new disc hits the loaded disc so that they may be harmed or spoiled together. With a view to prevent such an incident some disc apparatuses are equipped with insertion preventive means.

JP-A-2001-331999, titled "Disc Device" shows a disc apparatus equipped with disc insertion preventive means, wherein it is allowed the sure dosing of an inserting and discharging member by an accidental insertion preventive member by making a movable range of the accidental insertion preventive member larger with respect to a descending distance of a movable base. This proposed structure is complicated and accordingly the manufacturing cost is high.

JP-A-2002-150652, titled "Slot-In Type Optical Disc Reproducing Device" uses various sensors to detect and reject any undesired disc even if it is inadvertently inserted in the disc apparatus. The insertion preventive mechanism cannot work even if a single sensor does not function well, and the optical detecting-and-rejecting unit is less reliable than the mechanical one.

JP-A-11-149688, titled "Disc Carrying Device" allows insertion of only a larger diameter disc while preventing insertion of a smaller diameter disc. The device is provided with a pair of belt to carry the large diameter disc into the device, and rotatable restriction pins on the insertion path to prevent insertion of the smaller diameter disc. However, the device is complicated in the structure, and in case a smaller disc is erroneously inserted, it is feared not to return the status before insertion. Further, the device has no means to prevent insertion of a second disc when a disc is already inserted in the device.

JP-A-01-227258, titled "Autoloading Disc Player" allows insertion of only a larger diameter disc, in which pair of upper and lower carrier rollers as well as two detective switches are provided on the insertion path of a disc. It is provided with a control means and command means to stop and spin the opposite way when a smaller disc is inserted. However, the device is complicated in the structure too, and it costs and is likely to cause incorrect actions and troubles since it uses electrical control means. Further, the device has no means to prevent insertion of a second disc.

In view of the above one object of the present invention is to provide a disc insertion preventive device which is simple in structure, still assuring that when a disc apparatus is already loaded with a disc, another disc is prevented from being inserted into the device, no matter what size or shape the subsequent disc may have.

SUMMARY OF THE INVENTION

To attain this object a disc insertion preventive device according to the present invention comprises: a housing having a disc slot made on its front side; a stopper having a flat plate and front and rear blocking pieces dependent from the opposite lateral edges of the flat plate, the stopper being pivotally fixed to the housing with the front blocking piece directed toward the disc slot of the housing; and swinging means responsive to the absence of a disc in the housing for inclining the stopper with the rear blocking piece down and with the front blocking piece up, thus preventing advance of a disc beyond the descendent rear blocking piece; responsive to insertion of a disc for keeping the stopper horizontal, thereby permitting advance of the disc to the final loading position in the housing, and responsive to the presence of a disc in the housing for inclining the stopper with the rear blocking piece up and with the front blocking piece down, thereby preventing insertion of another disc from the disc slot.

The flat plate of the stopper may have first and second lateral narrow extensions from its opposite sides, and a leg extension extending downward from lateral side end of the first lateral narrow extension, the first lateral narrow extension having a slope formed on its upper surface, and the second narrow extension having an engagement projection. While, the swinging means may comprises: a first rotary lever having first and second arms, the first rotary lever being placed next to one end of the disc slot, and being spring-biased toward the stand-by position in which: the first arm is located to be hit and pushed by a disc when inserted in the disc slot; and the second arm is applied to the slope of the first lateral narrow extension of the flat plate of the stopper whereby the stopper may balance on the leg extension in response to insertion of the disc from the disc slot, allowing advance of the disc to the final loading position; a second rotary lever one end being rotatably fixed to the housing; forward and rearward rollers both ganged and movably fixed to the housing, and operatively connected to the second rotary lever, the rearward roller having latch means to keep the stopper inclined with the rear blocking piece down and with the front blocking piece up; the forward roller being placed so dose to the other end of the disc slot as to be hit and pushed by a disc when inserted in the disc slot, whereby the ganged rollers are shifted laterally to allow the rearward roller to release the stopper, and at the same time rotate the second rotary lever until it catch the other engagement projection of the second lateral narrow extension of the flat plate of the stopper, thus keeping the stopper standing on the leg extension; and a slider movably fixed to the housing, the slider having a cam abutting the leg extension of the stopper, the slider being movable in unison of the advance of the disc in the housing while allowing the leg extension to follow the cam contour, thus tilting the stopper when the disc reaches the final loading position so that the rear blocking piece rises up and that the front blocking piece descends down, thus preventing insertion of another disc from the disc slot.

The first rotary lever further may have a third arm to abut and hold the flat plate of the stopper when the second arm makes the stopper balance on the leg extension, thus preventing further rotation of the second arm.

The engagement projection of the second lateral narrow extension may be mounted swingably within a predetermined angle on the second lateral narrow extension, thereby enabling the engagement projection of the second narrow extension to catch the latch means of the rearward roller surely even when the timing of motions of the rearward roller and swinging of the stopper is shifted.

The engagement projection may comprise a base plate having an axis projecting downward, and a hook portion at the tip end, the engagement projection is being spring-biased to return to clockwise direction, while the second lateral narrow extension having a through hole, and the axis is being inserted into the through hole.

Other objects and advantages of the present invention will be understood from the following description of a disc insertion preventive device according to one preferred embodiment of the present invention, which is shown in accompanying drawings.

DETAILED DESCRIPTION OF PREFERRED EMBODIMENT

Figure 1A:
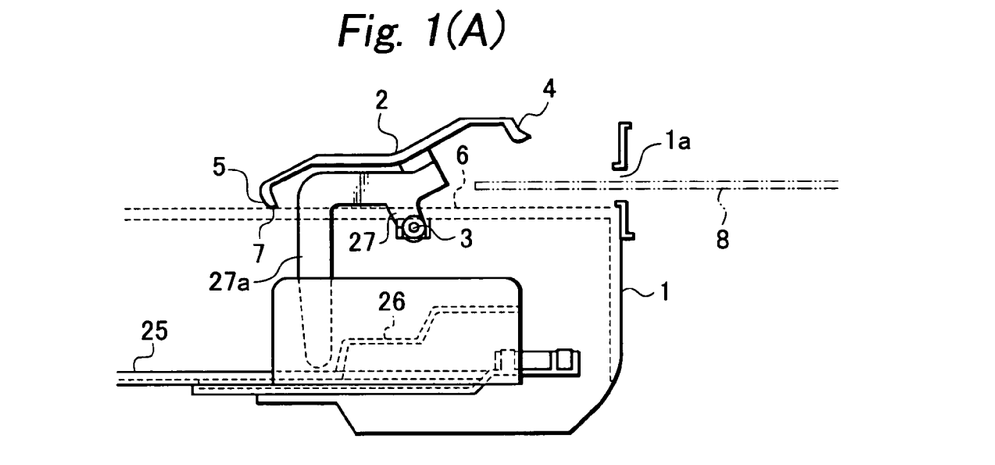
FIGS. 1(A), 1(B) and 1(C) show how the stopper change its postures while a disc is inserted from the disc slot until it reaches the final loading position in the housing.
Figure 1B:
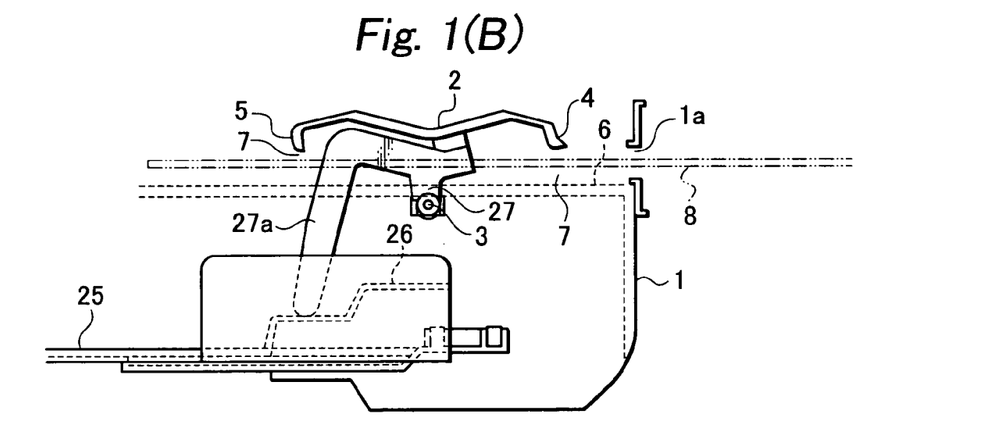
Figure 1C:
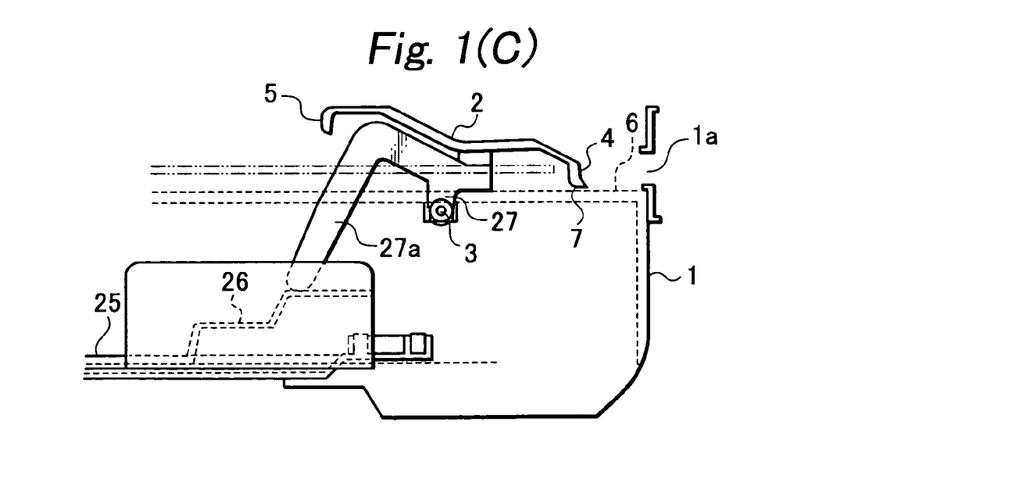
Figure 2:
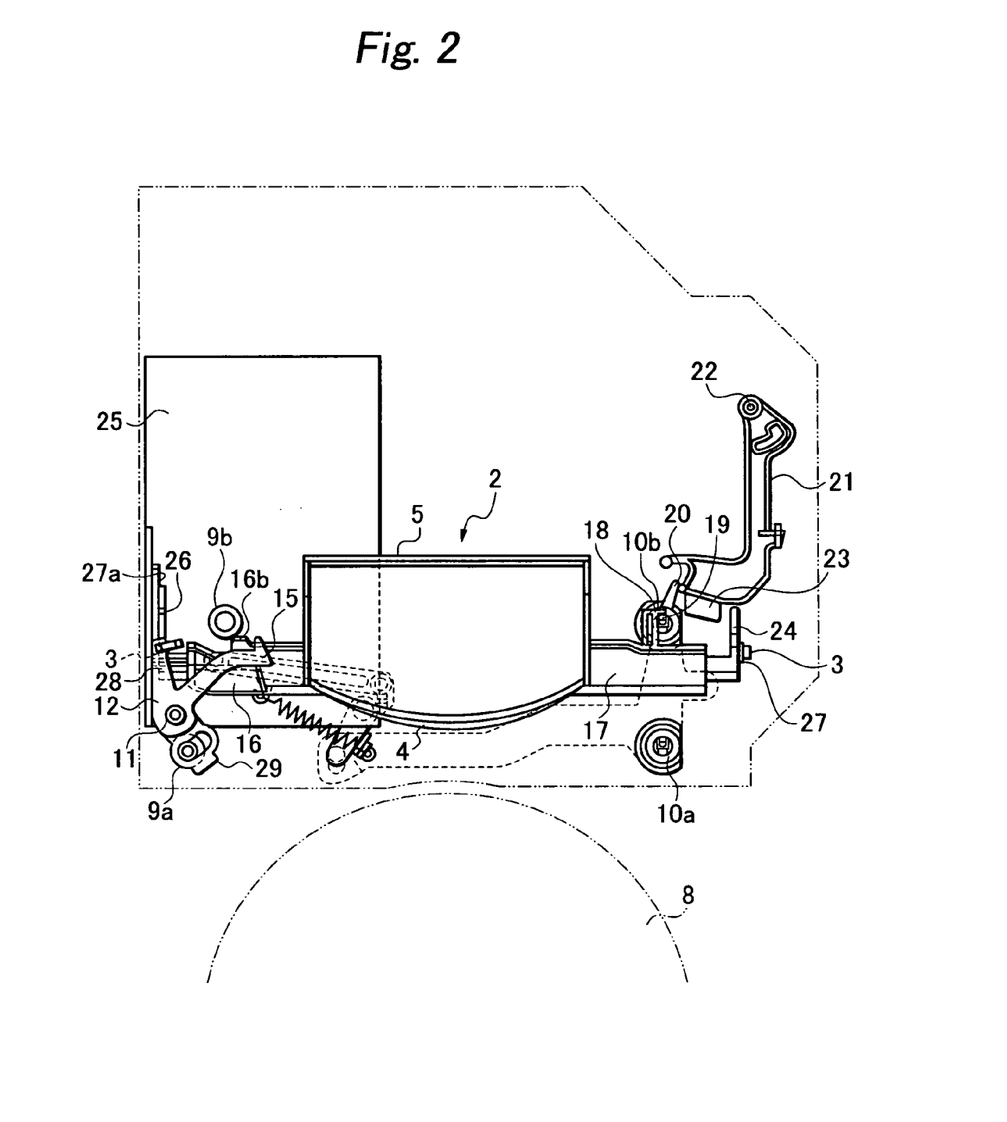
FIG. 2 is a plan view of the disc insertion preventive device, showing how its parts are operatively connected together before the disc is inserted in the housing.
Figure 3:
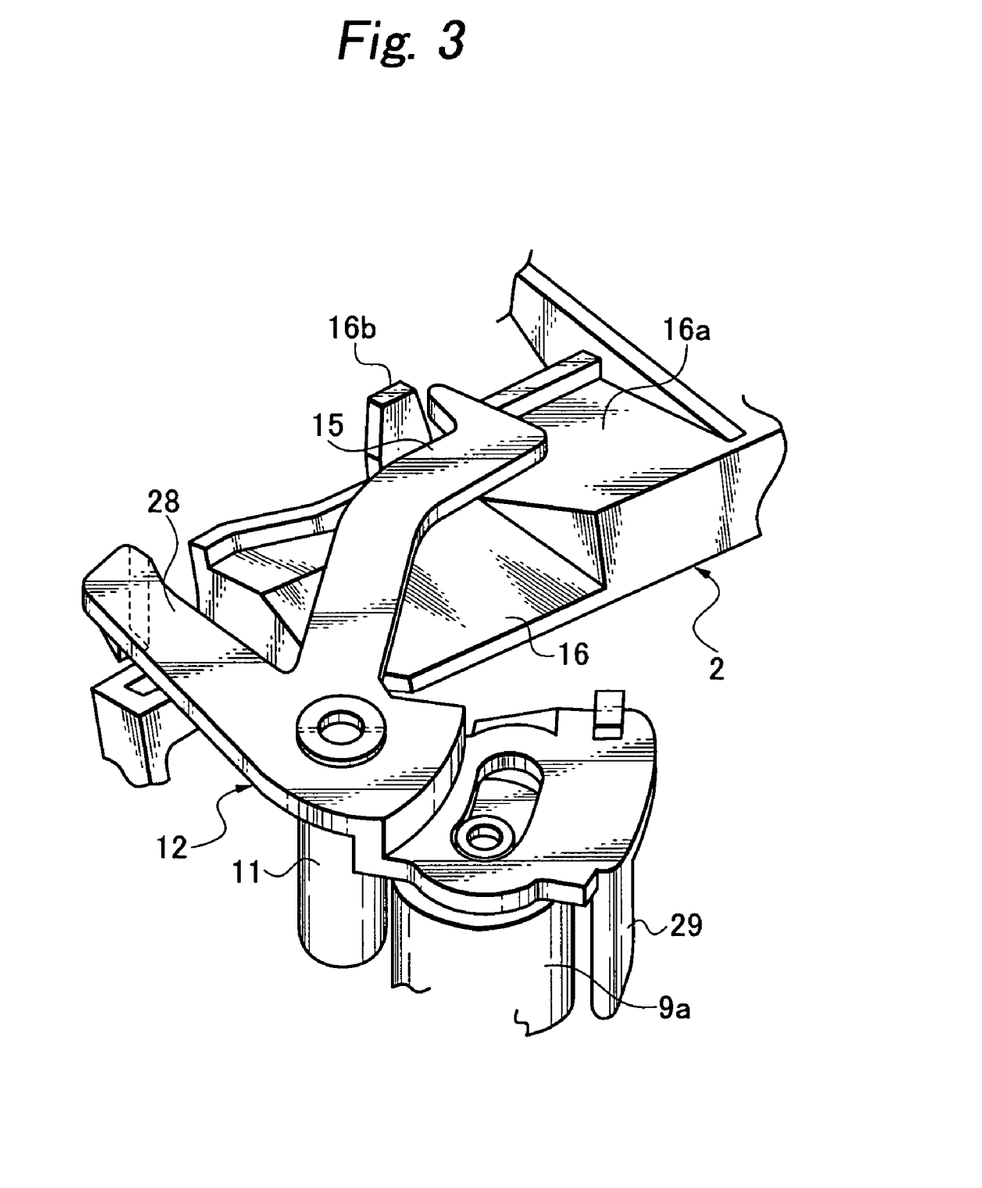
FIG. 3 is a perspective view of the first lever and the first lateral narrow extension of the stopper, showing how they are operatively connected before the disc is inserted in the housing.
Figure 4:
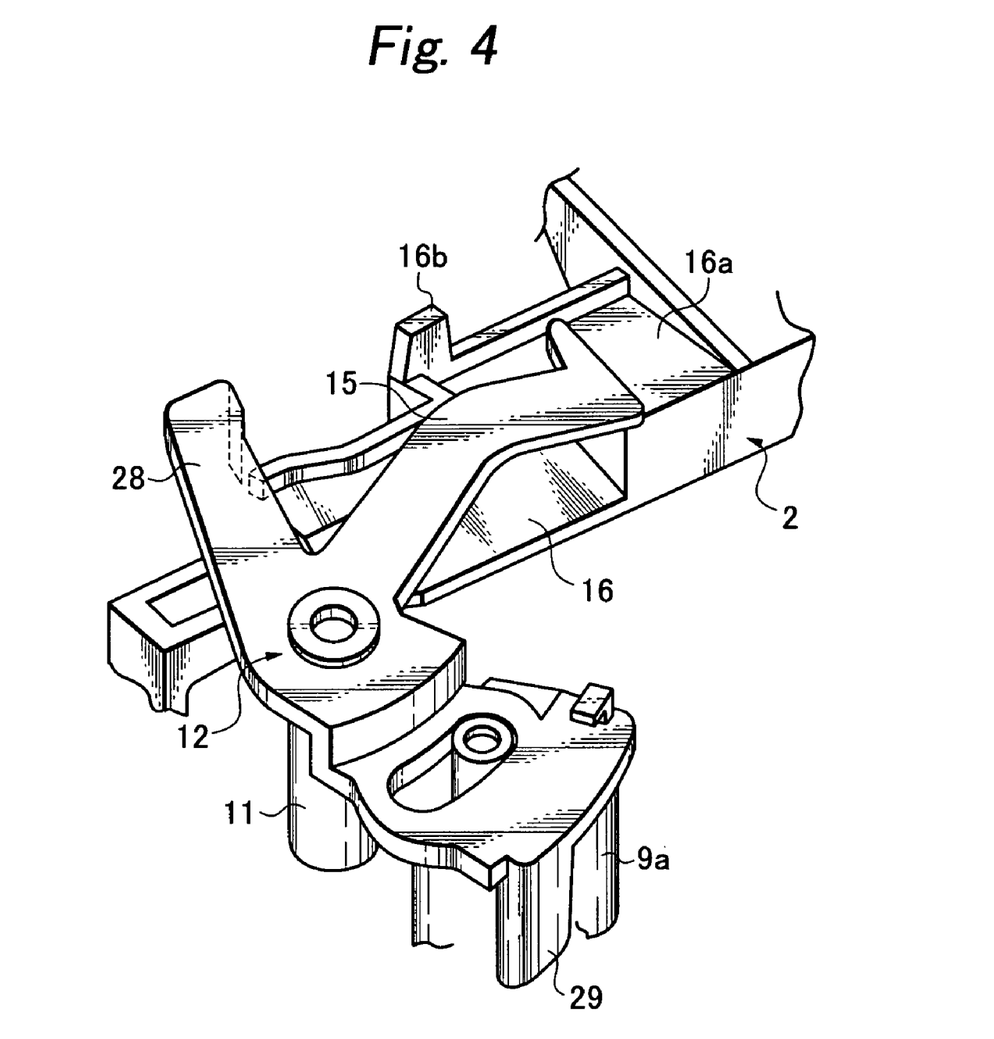
FIG. 4 is a similar perspective view, but showing how the first lever works on the first lateral narrow extension of the stopper when the disc is inserted to hit and rotate the first rotary lever.

Referring to FIGS. 1 and 2, a disc insertion preventive device comprises a housing 5 1 having a disc slot 1a made on its front side; a stopper 2 and means for swinging the stopper 2 (later described). The stopper 2 comprises a linear-and-convex flat plate having two lateral narrow extensions 16 and 17, and front and rear blocking pieces 4 and 5 dependent from the linear and convex edges of the flat plate. The first lateral narrow extension 16 has a slope 16a rising higher toward the disc slot 1a (see FIG. 3) whereas the second lateral narrow extension 17 has engagement projections 18 and 24 directed rearward. The stopper 2 is fixed to the housing 1 to rotate about its pivots 3, 3 via short legs 27, 27 extended from the both lateral side ends of the first and second narrow extensions 16 and 17, the front blocking piece 4 being directed toward the disc slot 1a of the housing 1. The short leg 27 of the first lateral narrow extension 16 has a leg extension 27a extending downward (see FIGS. 1(A) to 1(C)). The way 7 running from the disc slot 1a to the final loading position is defined between the intermediate flat surface 6 and the swingable stopper 2.

The swinging means is responsive to the absence of a disc in the housing 1 for inclining the stopper 2 with the rear blocking piece 5 down and with the front blocking piece 4 up, thus permitting insertion of a disc 8 from the disc slot 1a, but preventing advance of the disc 8 beyond the descendent rear blocking piece 5 by blocking the way 7 to the final loading position (see FIG. 1(A)). The swinging means is responsive to the partial insertion of the disc 8 in the housing 1 for making the stopper 2 balance on its leg extension 27a, not blocking the way 7 running from the disc slot 1a to the final loading position (see FIG. 1(B)). Also, the swinging means is responsive to the presence of a disc in the housing 1 for inclining the stopper 2 with the rear blocking piece 5 up and with the front blocking piece 4 down, thus preventing insertion of another disc 8 from the disc slot (see FIG. 1(C)).

Referring to FIGS. 2 to 6, the swinging means comprises a first rotary lever 12, a second rotary lever 21, forward and rearward rollers 10a and 10b, and a slider 25 (see FIGS. 1 and 2). The first rotary lever 12 has first, second and third arms 29, 15 and 28. It is placed next to one end of the disc slot 1a (the left end of the disc slot in FIG. 2), and is spring-biased toward the stand-by position (see FIG. 1(A)) in which: the first arm 29 is located to be hit and pushed by a disc 8 when inserted in the disc slot 1a; and the second arm 15 is applied to the slope 16a of the first lateral narrow extension 16 of the flat plate of the stopper 2 (see FIGS. 2 and 3). The second arm 15 is pushed to a hook 16b projected from the rear side edge of the first lateral narrow extension 16 in the stand-by position. When the disc 8 is inserted from the disc slot 1a, it hits and pushes the first arm 29. Then, the first arm 29 is yieldingly rotated clockwise, making the second arm 15 push the slope 16a (see FIGS. 4 and 5) until the second arm 15 makes the stopper 2 balance on the leg extension 27a. The third arm 28 abuts and holds the first lateral narrow extension 16 of the flat plate of the stopper 2, thus preventing further rotation of the second arm 15 (see FIG. 4). In this position two thirds of the disc 8 is inserted into the housing 1. The stopper 2 unblocks the way 7 to the final loading position (see FIG. 1(B)). Thus, advance of the disc 8 to the final loading position is permitted.

Figure 6:
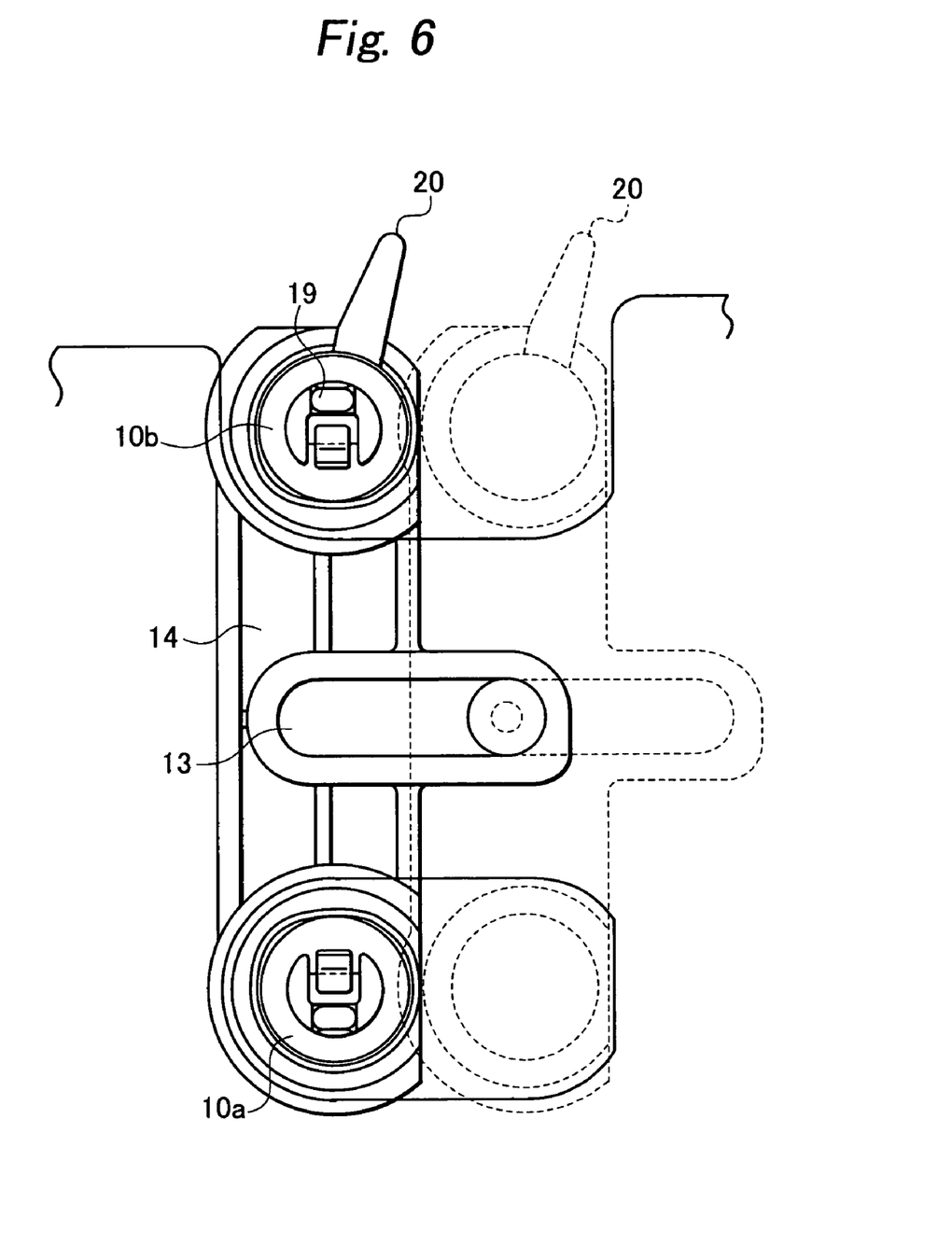
FIG. 6 is a plan view of the ganged rollers, which is responsive to insertion of the disc for moving and giving the way to the advancing disc (broken lines)

The forward and rearward rollers 10a and 10b are ganged with being connected by a connection plate 14 and fixed to the housing 1 movably sideways along a guide slot 13 formed in the connection plate 14 (see FIG. 6). The ganged rollers 10a and 10b confront the first rotary lever 12. The second rotary lever 21 looks like a fishhook. It has a pivot 22 on one end and a curved recess 21a formed on the other end. Also, it has a small flat projection 23 formed next to the curved recess 21a. The second rotary lever 21 is rotatably fixed to the housing 1, and is operatively connected to the rearward roller 10b of the ganged rollers 10a and 10b. The rearward roller 10b has a rearward finger 20 and latch means 19 formed on its top. In the stand-by position (FIG. 1(A)), the rearward finger 20 extends dose to the curved recess 21a of the second rotary lever 21 (see FIG. 2). The latch means 19 catches the engagement projection 18 of the second lateral extension of the stopper 2, thus keeping the stopper 2 inclined with the rear blocking piece 5 down and with the front blocking piece 4 up.

Figure 7A:
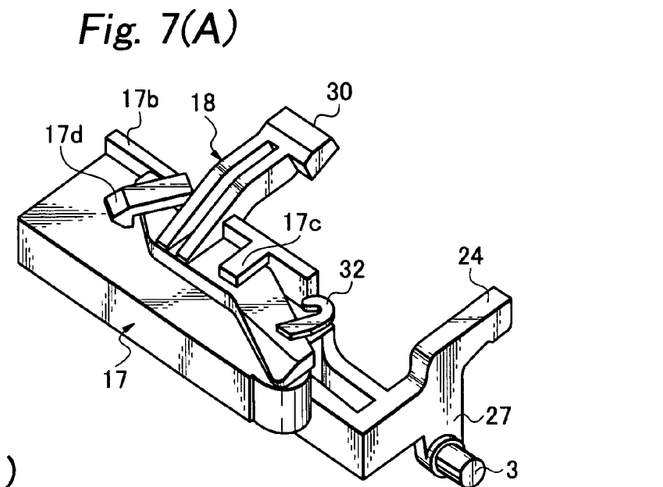
FIG. 7(A) is a perspective view showing another embodiment of the engagement projection of the second lateral narrow extension of the stopper.
Figure 7B:
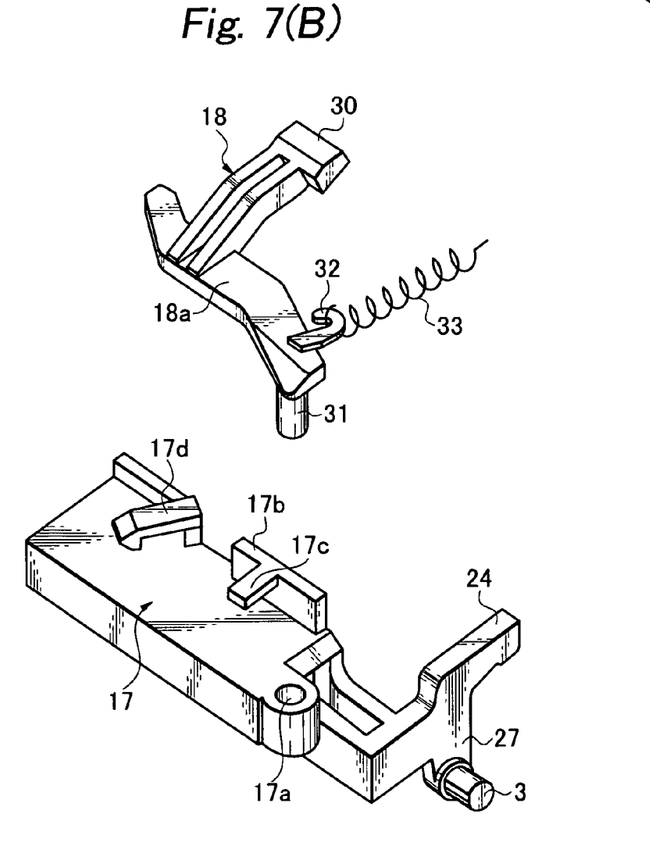
FIG. 7(B) is an exploded perspective view thereof.

FIGS. 7(A) and 7(B) show another embodiment of the engagement projection 18. In this embodiment the engagement projection 18 is mounted swingably within a predetermined angle on the second lateral narrow extension 17. The engagement projection 18 comprises a base plate 18a having an axis 31 projecting downward from its one end, and a hook head 30 at the tip end. The base plate 18a has a hook piece 32 for connecting a coil spring 33. The engagement projection 18 is spring-biased to return to clockwise direction by the coil spring. A through hole 17a is formed at the end of the second lateral narrow extension 17, and the axis 31 of the engagement projection 18 is inserted into the through hole 17a rotatably. A slip-preventive piece 17c and a rotation-preventive piece 17d are formed on a sidewall 17b of the second lateral narrow extension 17. The slip-preventive piece 17c overhangs above the base plate 18a to prevent the engagement projection 18 from slipping off from the through hole 17a. The rotation-preventive piece 17d overhangs above the base plate 18a and the tip end is bent downward to prevent anti-clockwise rotation of the engagement projection 18. The clockwise rotation of the engagement projection 18 is prevented by the sidewall 17b, and thus the rotation of the engagement projection 18 is limited within the scope of the interval between the bent tip end of the rotation-preventive piece 17d and the sidewall 17b.

Figure 8A:
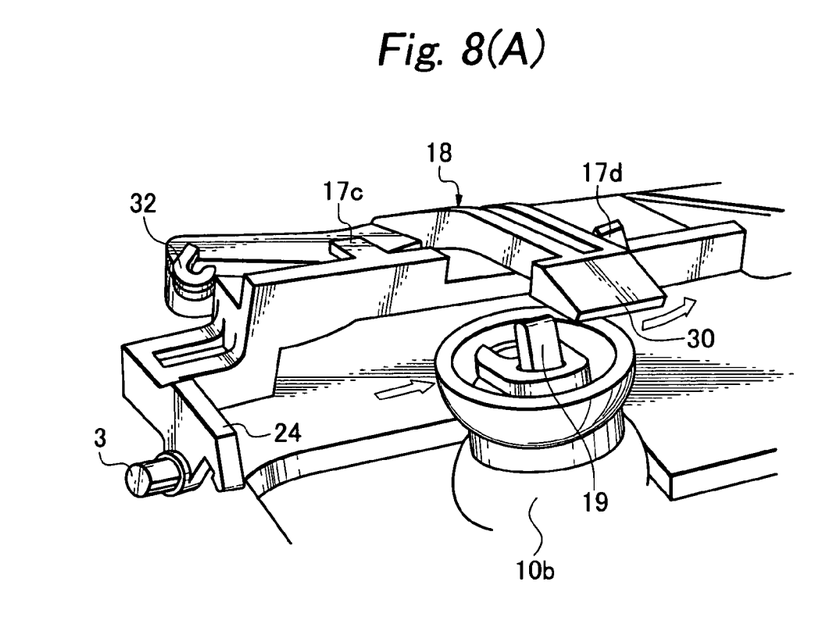
FIGS. 8(A) and 8(B) are perspective views of the rearward roller and the engagement projection of the stopper, showing how they are operatively connected or disconnected.
Figure 8B:
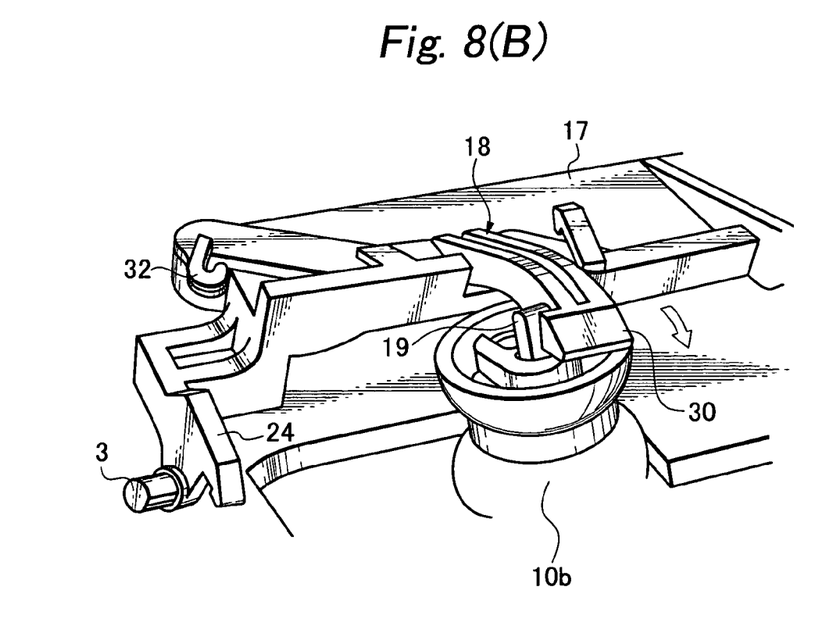

FIGS. 8(A) and 8(B) show how the rearward roller 10b and the swingable engagement projection 18 are operatively connected or disconnected. Following to ejecting motion of the disc 8, the second roller 10b moves to insert slot side and simultaneously the stopper 2 swings, however, the timing of those movements is likely to differ slightly. Thanks to the swingable arrangement of the engagement projection 18 as above, the latch means 19 can surely catch the hook head 30 of the engagement projection 18 even if such timing difference between those movements were caused.

Figure 5:
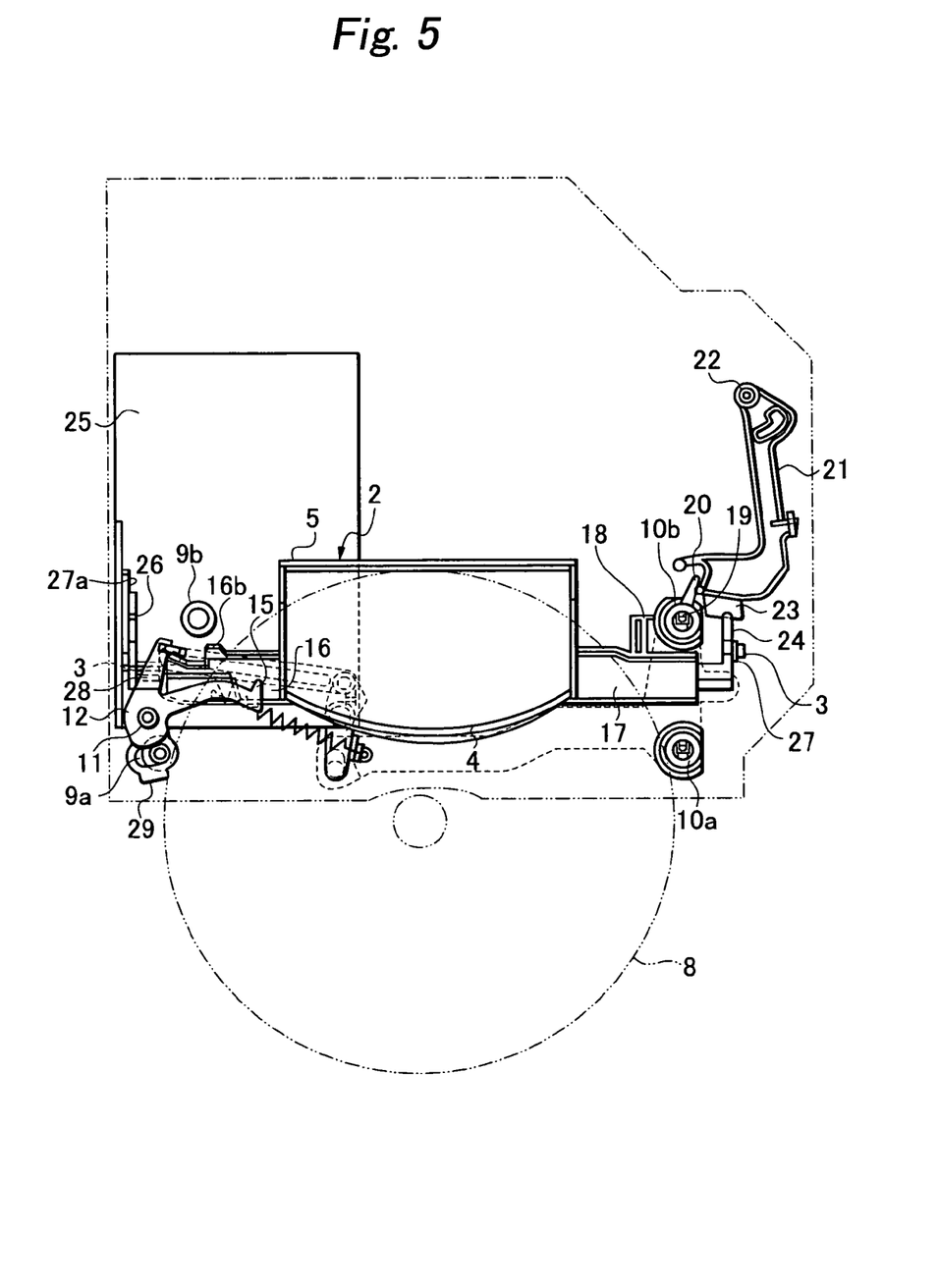
FIGS. 5 is a plan view of the disc insertion preventive device, showing how its parts are operatively connected together when the disc is partly inserted into the housing.
Figure 9:
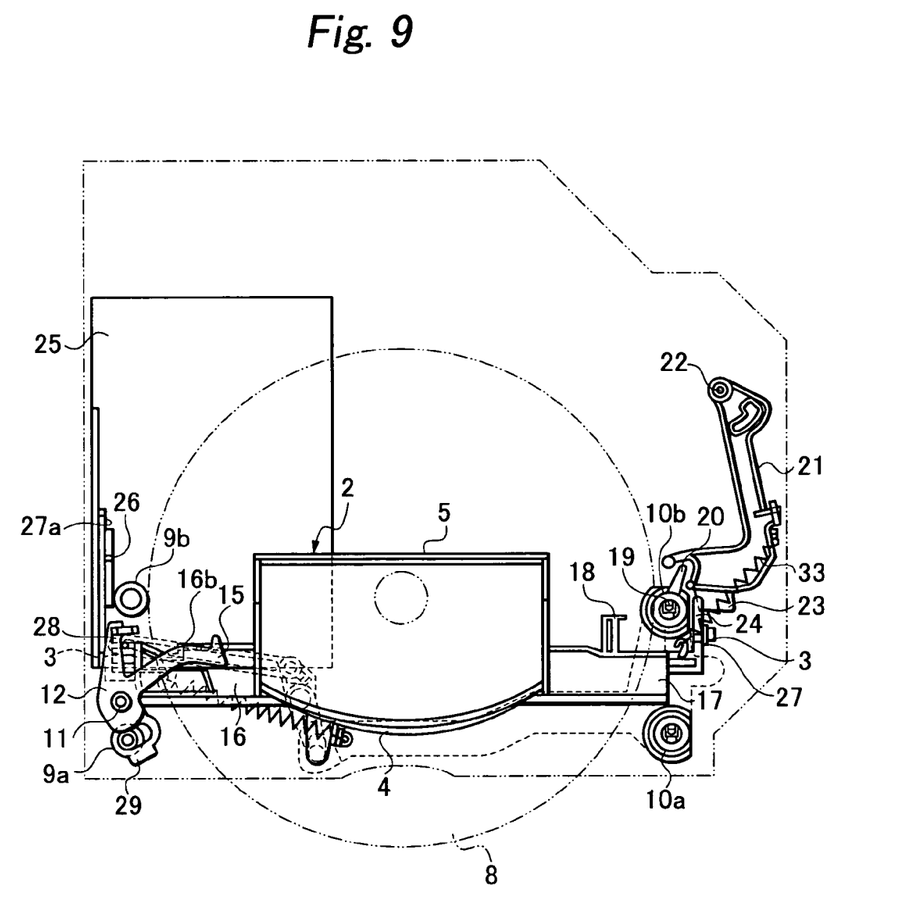
FIG. 9 is a plan view of the disc insertion preventive device, showing how its parts are operatively connected together when approximately two thirds of the disc is pushed in the housing.

The forward roller 10a is placed so dose to the other end of the disc slot 1a (the right end of the disc slot in FIG. 2) as to be hit and pushed by a disc 8 when it is inserted in the disc slot 1a, thus making the ganged rollers 10a and 10b move sideways to allow the rearward roller 10b to release hook head 30 of the engagement projection 18 of the stopper 2 (see FIG. 5). At the same time, the second rotary lever 21 is made to turn until the small flat projection 23 crawls under the engagement projection 24 of the second lateral extension of the stopper 2, thus keeping the stopper 2 balancing on the leg extension 27a (see FIGS. 1(B) and 9).

When insertion of the disc 8 is detected by a sensor (not shown), first and second drive rollers 9a and 9b start rotating to pull the disc 8 into the housing 1. Then, the disc 8 is pinched between the first and second drive rollers 9a and 9b and the ganged rollers 10a and 10b, and the disc 8 is carried to the final loading position where the turntable is ready to fit the disc 8.

The slider 25 is movably fixed to the housing 1 (see FIGS. 1 and 2). The slider 25 has a cam 26 abutting the leg extension 27a of the stopper 2, and it is movable in unison with the advance of the disc 8 in the housing 1 while allowing the leg extension 27a to follow the cam contour 26.

Figure 10:
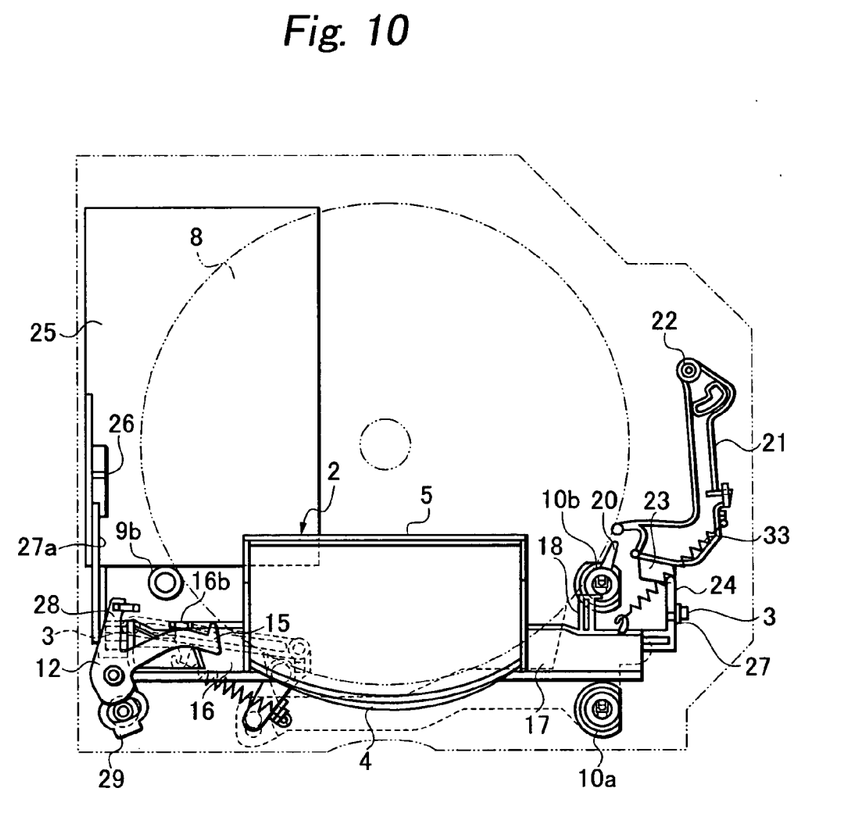
FIG. 10 is a plan view of the disc insertion preventive device, showing how its parts are operatively connected together when the disc is loaded.

Thus, the stopper 2 is tilted so that the rear blocking piece 5 rises up and that the front blocking piece 4 descends down (see FIG. 1(C)). Thus, insertion of another disc from the disc slot 1a is prevented when the disc 8 reaches the final loading position. FIG. 10 shows that the disc 8 is fully inserted in the disc apparatus.

Release of the disc 8 from the turntable make: the leg extension 27a of the stopper 2 return toward the disc slot 1a; the first and second rollers 10a and 10b move inward; the first rotary lever 12 rotate counter clockwise; and the stopper 2 return from FIG. 1(B) to FIG. 1(A). All these parts are spring-biased to return to their initial positions in response to release and ejection of the disc from the disc apparatus.

As described above, when the disc apparatus is loaded with a disc 8, the rear blocking piece 5 of the stopper 2 blocks the way 7 to the loading position (see FIG. 1(C)), thereby preventing another disc if inserted from the disc slot 1a from reaching the turntable. When the disc apparatus is not loaded, the stopper 2 remains in the stand-by position (FIG. 1(A)), where the loading of a smaller disc (80 mm in diameter) is not permitted. Specifically when the smaller disc is inserted from the disc slot 1a, it cannot move forward beyond the descending rear blocking piece 5. It is too small in diameter to hit and actuate the first rotary lever 12 and the forward roller 10a simultaneously. Specifically, the clockwise rotation of the first rotary lever 12 and the outward movement of the ganged rollers 10a and 10b cannot be caused simultaneously, and therefore, the stopper 2 remains in the stand-by position, in which the rear blocking piece 5 blocks the way 7 to the loading position. Likewise, insertion of a deformed disc is not permitted.

Any swinging means other than the above described one can be used as for instance follows: the stopper is connected to and driven by an electric motor. The electric motor turns the stopper when associated sensors detect insertion of a disc from the disc slot. Such sensors may be arranged to detect discs in respect of their sizes. They direct signals to the electric motor only when they recognize the disc of regular size and shape. Some sensors may be arranged in the vicinity of the turntable, and the stopper remains in FIG. 1(C) as long as the sensors detect the loading of the disc.

What is claimed is:

1. A disc insertion preventive device comprising:
a housing having a disc slot made on its front side;
a stopper having a flat plate and front and rear blocking pieces dependent from the opposite lateral edges of the flat plate, the stopper being pivotally fixed to the housing with the front blocking piece directed toward the disc slot of the housing; and
swinging means responsive to the absence of a disc in the housing for inclining the stopper with the rear blocking piece down and with the front blocking piece up, thus preventing advance of a disc beyond the descendent rear blocking piece; responsive to insertion of a disc for keeping the stopper horizontal, thereby permitting advance of the disc to the final loading position in the housing, and responsive to the presence of a disc in the housing for inclining the stopper with the rear blocking piece up and with the front blocking piece down, thereby preventing insertion of another disc from the disc slot.

2. A disc insertion preventive device according to claim 1, wherein the flat plate of the stopper has first and second lateral narrow extensions from its opposite sides, and a leg extension extending downward from lateral side end of the first lateral narrow extension, the first lateral narrow extension having a slope formed on its upper surface, and the second narrow extension having an engagement extension; the swinging means comprising:

a first rotary lever having first and second arms, the first rotary lever being placed next to one end of the disc slot, and being spring-biased toward the stand-by position in which: the first arm is located to be hit and pushed by a disc when inserted in the disc slot; and the second arm is applied to the slope of the first lateral narrow extension of the flat plate of the stopper whereby the stopper may balance on the leg extension in response to insertion of the disc from the disc slot, allowing advance of the disc to the final loading position;

a second rotary lever one end being rotatably fixed to the housing;

forward and rearward rollers both ganged and movably fixed to the housing, and operatively connected to the second rotary lever, the rearward roller having latch means to keep the stopper inclined with the rear blocking piece down and with the front blocking piece up; the forward roller being placed so dose to the other end of the disc slot as to be hit and pushed by a disc when inserted in the disc slot, whereby the ganged rollers are shifted laterally to allow the rearward roller to release the stopper, and at the same time rotate the second rotary lever until it catch the other engagement projection of the second lateral narrow extension of the flat plate of the stopper, thus keeping the stopper standing on the leg extension; and a slider movably fixed to the housing, the slider having a cam abutting the leg extension of the stopper, the slider being movable in unison of the advance of the disc in the housing while allowing the leg extension to follow the cam contour, thus tilting the stopper when the disc reaches the final loading position so that the rear blocking piece rises up and that the front blocking piece descends down, thus preventing insertion of another disc from the disc slot.

3. A disc insertion preventive device according to claim 2, wherein the first rotary lever further having a third arm to abut and hold the first lateral narrow extension of the flat plate of the stopper when the second arm makes the stopper balance on the leg extension, thus preventing further rotation of the second arm.

4. A disc insertion preventive device according to claim 2, wherein the engagement projection of the second lateral narrow extension is mounted swingably within a predetermined angle on the second lateral narrow extension.

5. A disc insertion preventive device according to claim 4, wherein the engagement projection comprising a base plate having an axis projecting downward, and a hook portion at the tip end, the engagement projection is being spring-biased to return to clockwise direction, while the second lateral narrow extension having a through hole, and the axis is being inserted into the through hole.

* * * * *